June 19, 1962     G. HEIDELBERG     3,039,537
PROPULSIVE MEANS FOR AIRCRAFT

Filed June 19, 1959     3 Sheets-Sheet 1

INVENTOR:
GÖTZ HEIDELBERG
BY
ATTORNEY

June 19, 1962   G. HEIDELBERG   3,039,537
PROPULSIVE MEANS FOR AIRCRAFT
Filed June 19, 1959   3 Sheets-Sheet 2
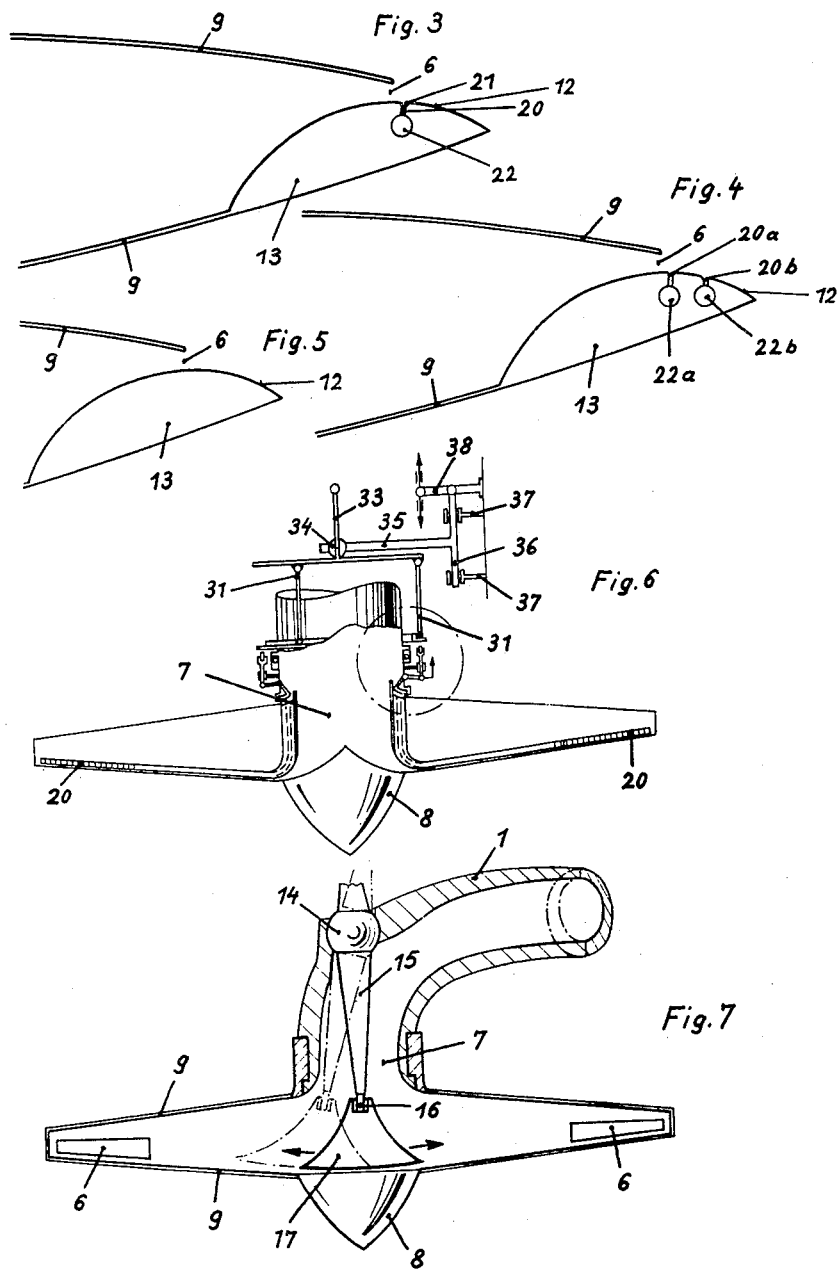
INVENTOR:
GÖTZ HEIDELBERG
BY June 19, 1962  G. HEIDELBERG  3,039,537
PROPULSIVE MEANS FOR AIRCRAFT Filed June 19, 1959  3 Sheets-Sheet 3

INVENTOR
GÖTZ HEIDELBERG
BY
ATTORNEY

United States Patent Office 3,039,537
Patented June 19, 1962

1

3,039,537
PROPULSIVE MEANS FOR AIRCRAFT
Götz Heidelberg, Ottobrunn, near Munich, Germany, assignor to Bölkow-Entwicklungen, Kommanditgesellschaft, Ottobrunn, near Munich, Germany
Filed June 19, 1959, Ser. No. 821,406
Claims priority, application Germany June 23, 1958
13 Claims. (Cl. 170—135.4)

The present invention relates to improvements of propulsive means for aircraft and especially to improvements of means in the case of which a gas stream leaves an exit slot arranged at the wing of an aircraft. Above all the invention relates to means which can influence the direction of the gas stream leaving the exit slot. Moreover, the invention particularly relates to propulsive means for aircraft of the helicopter family in the case of which a pressure gas flows out off exit slots arranged at a freely pivoted hollow blade which is thus made to rotate. The invention particularly provides means to influence the direction of the pressure gas stream leaving the exit slots of said rotating blades.

It is known that the direction of a pressure gas stream can be influenced by movable devices arranged at an edge of the exit slot. It is difficult, however, to control the adjusting devices, especially when the gas stream contains combustion gases or consists of combustion gases due to which the temperatures at the exit are increased.

It is therefore an object of the invention to provide a propulsive means of said type in such a way that the outflow direction of the gas jet can be influenced without any movable means being provided at or near the gas exit slot at the blade.

Another object of the present invention consists in influencing the direction of the leaving gas jet by applying the "Coanda-effect."

It is still another object of the invention to provide the blade with a curved guide surface which projects over one edge of the gas exit. Depending on the characteristics of the outflowing gas jet, especially of the gas discharge velocity and of the gas volume, the outflowing gas jet follows the curvature of the guide surface under the "Coanda-effect" up to a line of separation which can be chosen according to the invention and at which the gas flow breaks away from the guide surface nearly tangentially.

According to the invention the position of the line of separation can additionally be influenced by openings in the guide surface which are connected through one or more tubes to means by which a further gas flow is blown out through the openings or by which gas is sucked off. It is accordingly another object of the invention to provide such openings and means for blowing or sucking a gas stream out of the openings.

It is another object of the invention to change the position of the line of separation of the gas stream leaving the exit slot in such a way by blowing or sucking the gas or air stream out of said openings in dependence of the rotation of the blade that the gas stream leaving the exit slot has an outflow direction within a certain range of the angle of rotation of the blade which differs from that in another or in the residual range of the angle of rotation.

It is another object of the invention to provide control means through which the pilot of the rotorcraft can alternatively change the discharge angle of the gas stream over the whole range of the angle of rotation of the blade or over a certain range of said angle only by actuating a pitch lever and a control stick.

Other important objects and advantages of the invention will become apparent when reading the following description in connection with the attached drawings in which preferred embodiments of the invention are shown for purposes of illustration.

In the drawings—

FIG. 3 is a partial transverse section of a blade end according to a first embodiment on a larger scale than in FIGS. 1 and 2.

FIG. 4 is a partial transverse section of a blade end according to a second embodiment on the scale of FIG. 3.

FIG. 5 is a partial transverse section of a blade end according to a third embodiment on the scale of FIGS. 3 and 4.

FIG. 6 is a transverse section of a rotor for explaining the control actions according to a first embodiment on an enlarged scale compared to FIGS. 1 and 2 on a reduced scale compared to FIGS. 3 to 5.

FIG. 7 is a transverse section of a rotor similar to FIG. 6 with a control device according to a second embodiment.

Figure 1:
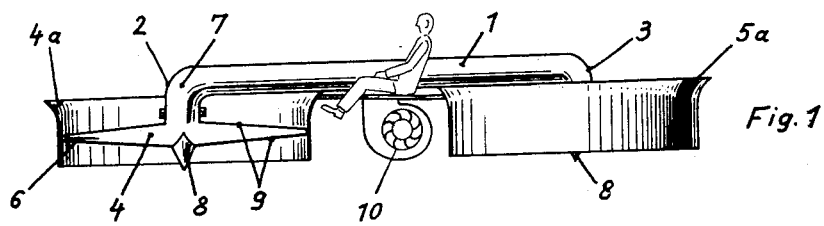
FIG. 1 is a side elevation of a preferred embodiment of a rotorcraft with propulsive means according to the present invention.
Figure 2:
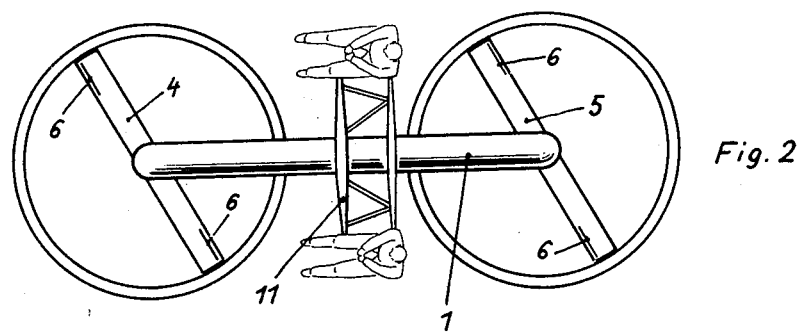
FIG. 2 is a plan view of the rotorcraft shown in FIG. 1.

The embodiment of a rotorcraft shown in FIGS. 1 and 2 with propulsive means according to the present invention consists of a tube-shaped base body 1, the ends 2 and 3 of which are bent downward rectangularly. The expressions "downward" and "upward" used in the present description and in the claims refer to the level flight of the rotorcraft equipped with the propulsive means according to the present invention.

A blade 4 is pivoted onto the end 2 of the base body 1. Another blade 5 is pivoted onto the end 3 of the base body 1. The blades 4 and 5 therefore rotate in the same plane of rotation, but in contrary senses of rotation which will be seen from the following description, and hence the gyroscopic couples acting on the base body 1 compensate each other.

Blade 4 has an exit slot 6 at the end of its one longitudinal edge and another exit slot 6 at the opposite end of its other longitudinal edge. Hence the exit slots 6 are arranged opposite each other. In a similar way blade 5 is provided with exit slots 6. Blades 4 and 5 are hollow, i.e. apart from an opening 7 in the hub 8 of the blade the hollow space surrounded by the blade walls 9 is covered in all round. The openings 7 of the blades 4 and 5 are connected to the hollow space of the round base body.

Mounted to the base body 1 is an engine-turbine set which sucks in air from the atmosphere and the pressure air exit of which is connected to the tube-shaped base body 1. Consequently the pressure air produced by the engine-turbine set flows through the tube-shaped base body 1 through the openings 7 to the hollow space of the blades 4 and 5 and leaves through the exit slots 6. Owing to the reaction the blade 4 according to FIG. 2 rotates clockwise, while blade 5 rotates anticlockwise.

Instead of the engine-turbine set 10 other means producing a pressure medium can be used, too, for instance a combustion plant.

As indicated schematically in FIGS. 1 and 2 a bench 11 carrying the pilot's seat or the pilots' seats and other attaching parts of the rotorcraft which are not shown can be fixed. The blades 4 and 5 can be surrounded by rings 4a and 5a, respectively, which are fastened to the base body 1.

Figure 8:
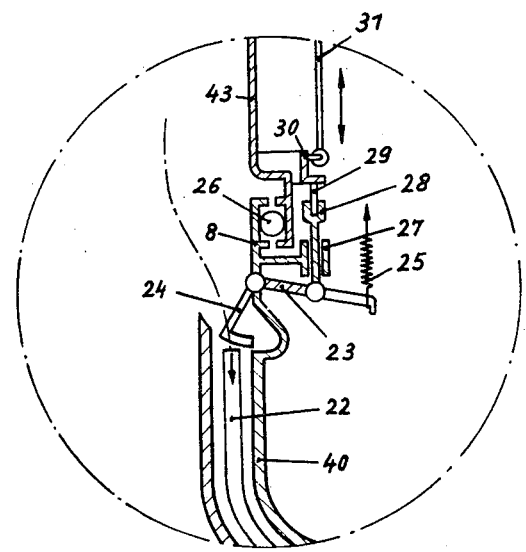
FIG. 8 shows a detail of FIG. 6 on a larger scale.

In order to render the rotocraft manoeuverable the exit slots 6 according to the invention have been designed in a special way, as shown in FIGS. 3 to 5. Moreover, special means for distributing the air stream produced by the set 10 have been provided for, as shown in FIGS. 6 to 8.

At the lower longitudinal edge of the exit slot 6 a body 13 is mounted to the wall 9 of each blade. Said body 13 defines the exit slot 6 and forms a curved guiding surface 12 projecting over the exit slot 6. Under certain conditions, i.e. at a certain discharge velocity of the gas jet produced by the set 10 and leaving through the exit slot 6 the gas jet will attach to the curved guiding surface 12 so that it will be deflected according to the curvature of the guiding surface 12 after leaving the slot 6. Under these operational conditions the gas jets will therefore leave the exit slots 6 of the blades 4 and 5 in oblique downward directions. If the characteristics of the gas jets leaving the exit slots 6 are modified, it can be obtained that the gas jets do not follow the guiding surfaces 12 or follow the guiding surfaces 12 up to a certain line of separation only. In the first case the gas jets will consequently leave the exit slots 6 tangentially. In the second case the gas jets follow the curvature of the guiding surfaces 12 over a certain distance and then separate, i.e. they leave the guiding surfaces 12 and flow off approximately tangentially.

The characteristics of the leaving gas jet can be modified for instance by means of the device shown in FIG. 7. In the case of this device a control lever 15 is supported in the base body 1 by a hinged bearing 14 so that it can be deflected. Through a guide rail 16 a replacement body 17 is fitted to the end of the control lever 15 projecting into the opening 7 of the blade. If, by means of the lever 15, the replacement body 17 is turned into the position indicated in FIG. 7 by a dashed line, a greater portion of the gas stream produced by the set 10 and conducted to the blade flows to the exit slot seen on the right of FIG. 7 and a smaller portion flows to the exit slot 6 on the left of FIG. 7. When the blade rotates about the end of the stationary base body 1 the volume of the gas stream supplied to the one exit slot 6 increases from a minimum to a maximum during half a rotation of the blade and decreases again from the maximum to the minimum during the next half rotation of the blade. The same holds inversely for the other exit slot. According to the above description the angle of the gas stream flowing away from one of the curved guiding surfaces 12 changes in function of the gas volume supplied to one of the exit slots 6. A moment about the rolling axis coinciding with the longitudinal axis of the base body 1 will thus occur for the embodiment shown in FIGS. 1 and 2, i.e. the actuation of the control lever 15 has a similar effect as the actuation of the ailerons in the case of conventional aircraft.

The directions of the gas jets leaving the exit slots 6 can be influenced by further means. These means can be applied together with the possibility of control described, especially for stabilizing the operation. They can also be applied alone, which will be seen from the following description.

In the case of the embodiment of the body 13 shown in FIG. 5 the curved guiding surface 12 forms a homogeneous surface. In the case of the embodiment shown in FIG. 3 openings 20 have been provided for in the guiding surface 12. These openings 20 are arranged at a certain distance from each other in a row proceeding transversely to the gas stream leaving the exit slot 6 (cf. also FIG. 6). The openings 20 connected to each other by a groove 21 are connected to a tube 22. If the characteristics of the gas stream leaving the exit slot 6 were chosen in such a way that this gas stream would attach to the curved guiding surface 12 up to beyond the row of the openings 20, one could now make the gas stream separate from the guide surface 12 off the openings 20, when another gas or air stream were blown through the tube 22 and out of the openings 20. In other words, this blowing out of the openings 20 of the gas stream causes an earlier separation of the gas stream on the curved guiding surface 12.

On the other hand, if the characteristics of the gas streams leaving the exit slots 6 were chosen in such a way that they would flow off tangentially from the guiding surfaces before the openings 20, the gas streams could be made attach to the guiding surfaces 12 up to at least off the exit openings 20 by sucking air or gas out of the tube 22.

It is surprising that relatively small quantities of gas have to be blown off or sucked out of the openings for achieving this object. When blowing off gas a relatively small quantity suffices to produce a disturbance which acts against the "Coanda effect" so that the gas stream does no longer follow the curvature of the guiding surface 12 beyond the row of the openings 20. In the case of sucking out gas the boundary layers and gas vortices are sucked off which would otherwise start the separation of the gas stream from the curved guide surface 12 so that the "Coanda effect" becomes effective and the gas stream leaving the exit slot 6 continues following the curvature of the guiding surface 12.

For better command of the effect and for more sensitive control of the direction of the jet leaving the exit slot 6 a greater number of openings can also be provided for in the curved guiding surface 12. FIG. 4 shows an embodiment in which two rows of openings 20a and 20b have been provided for in the curved guiding surface 12. The row of the openings 20a is connected to a tube 22a, while the row of the openings 20b is connected to a tube 22b. It can easily be understood that still further rows of openings can be provided for in the guiding surface 12.

If a gas stream is blown through the tube 22a and out of the openings 20a, this stream will separate from the curved guiding surface 12 before the openings 20a, which has been described above. If a gas stream is blown out of the openings 20b, it separates from the curved guiding surface 12 shortly before the openings 20b. In order to fix the position of the separating stream on the guiding surface 12 shortly before the openings 20b, gas can additionally be sucked out of the tube 22a, while gas is blown through the tube 22b out of the openings 20b. If more than two rows of openings are used, the line of separation of the gas stream from the guiding surface 12 can therefore be transferred to between any two rows by sucking gas out of the openings in the guiding surface lying before the line of separation, while gas is blown out of the openings behind the line of separation. In the simplest case the tubes 22 and 22a and 22b, respectively, can end in the open air so that the air stream passing the blade sucks gas out of the tubes or presses air into them. If sucking gas out of or pressing air into the tubes occurs periodically with the rotation of the blade, the embodiment shown in FIGS. 6 and 8 can be used.

According to this embodiment the tubes 22 are led up to near the hub 8 of the blade ending there with a branch which runs parallel to the axis of rotation of the blade. Near the free end of the tube 22a lever 23 is pivoted to the hub 8 of the blade carrying a control flap valve 24. By deflecting the lever 23 and thus the control flap valve 24 connected to it the tube 22 ending within the opening 7 of the blade 3 can therefore be opened or closed. If the control flap valve 24 is opened, part of the gas stream produced by the set 10 and flowing through the opening 7 of the blade to the exit slots 6 will enter the tube 22 and will accordingly be blown out through openings 20. Lever 23 is connected to a spring 25 tending to bring flap valve 24 into that position in which tube 22 is open. Hub 8 is rotatably supported on end portion 2 of base body 1 in an arrangement the right hand portion of which is shown in FIG. 8 in an enlarged scale and in the same cross-section as that of FIG. 6.

In FIG. 8 bearing ball 26 is shown to support rotatably hub 8 of blade 4 and, in turn, it is supported on flange 3 of end portion 2.

As further apparent from FIG. 8, hub 8 has projecting therefrom a bracket 27 through which a control lever extends vertically moveable and terminating at its top end into a fork or tappet 28. The bottom end of tappet lever 28 is linked to angular lever 23 controlling the position of flap 24, while the top end of tappet lever 28 carries roller 29 running on the bottom side of a tiltable disc or ring 30 surrounding tubular end portion 2. Ring 30 is connected to be controlled by the vertical movement of three control levers 31 attached to ring 30 at points peripherally spaced apart by 120°.

The above description will also supply to the left hand portion of the cross-section of FIG. 6 which contains substantially the same elements 23 through 29 as the right hand portion, except that these elements on the left side are arranged in a mirror-reversed relationship.

Thus each arm of blade 4 is controlled by at least one control lever 23 with flap 24 which, in turn, is controlled by a roller such as shown at 29 engaging the bottom side of ring 30.

Ring 30, on the other hand, is tilted into predetermined planar positions by connecting the three control levers 31 to intermediate rods or links 31a attached peripherally to disc 32 at points spaced apart by 120° in a manner similar to the displacement of control levers 31 around ring 30.

Disc 32, and thereby ring 30, is tilted by means of a control stick 33 terminating in bearing ball 34 which is attached to disc 32. Ball 34 in turn is held rotatable between gimbals attached to supporting rod 35 extending into a pitch lever 38 rotatable about axis 37. Gimbals and ball 34 may be moved up and down by rotating the supporting rod 35 about its right end under control of arm 36.

By actuating pitch lever 38, bearing ball 34, and thereby disc 32 and ring 30, are either lifted or lowered thus selectively opening or closing tubes 22. In this case, the direction of the gas jets leaving slots 6 are changed in the same direction. By moving control stick 33, however, disc 32 and ring 30 are tilted and the two valve flaps 24 are turned in opposite directions relative to their closing and opening movements, and hence the directions of the gas jets leaving the exit slots 6 are changed in function of the rotation of the blade according to the characteristic described in connection with FIG. 7.

If two rows of openings 20a and 20b are provided for—as described in connection with FIG. 4—another tube 40 (FIG. 8) which is arranged coaxially to the tube 22 can be used for supplying the pressure gas to the second row of openings.

Figure 9:
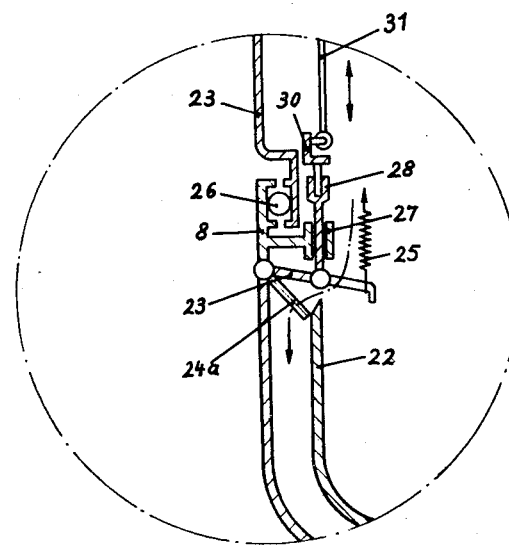
FIG. 9 is another embodiment of the detail shown in FIG. 8.

The embodiment shown in FIG. 9 differs from that shown in FIG. 8 only insofar as the tube 22 is led vertically upwards at the outside of the hub 8 and the valve flap 24a is therefore arranged in an acute angle to the lever 23. Moreover, only one tube 22 has been provided for.

The control elements 23 to 31 for the flap valve 24a, however, are the same as those described in connection with FIG. 8. If the control lever is pressed down, the flap valve 24a will turn anticlockwise so that the outside air passing the hub 8 can enter the tube 22. Owing to the rotation of the blade the centrifugal forces press the air to the openings 20 from which it is blown out under pressure. When the control levers 31 are drawn upwards, the flap valve 24a closes, and hence the access of air to the tube 22 is blocked.

Moreover, the embodiment shown in FIG. 8 differs from that of FIG. 9 insofar as the control flap valve 24 according to FIG. 8 has a "trapezoidal" characteristic, when it is opened and closed, while the control flap valve 24a according to FIG. 9 has a "sinusoidal" characteristic. Therefrom results that—in the case of the embodiment according to FIG. 8—the gas stream enters the tube 22 rather suddenly, when the flap valve reaches the position of a certain angle of rotation, while—in the case of the embodiment according to FIG. 9—the entering gas volume increases gradually, when the flap valve 24a is turned anticlockwise.

It can be clearly seen that considerable modifications can be made in order to realize the control principle according to the invention. The main principle of the invention consists in changing the direction of the gas or pressure air jet leaving an exit slot by means of the "Coanda-effect" by fitting a curved guiding surface to an edge of the exit slot and in influencing the change of direction in a controllable way by the indicated means. Accordingly, the invention is not limited to the influencing means shown in particular.

The above examples are for the purpose of illustrating some of the methods and means by which the broad purpose of this invention may be carried out and are not to be deemed as restrictive in any manner. Other modifications and alternatives will occur to those skilled in the art without departing from the scope of the invention as defined by the following claims.

I claim:

1. In a propulsive means for aircraft, a hollow rotary wing having opposite longitudinal edges with substantially longitudinal exit slots along said edges, a girder arm supporting said rotary wing and having a hollow space communicating with the interior of said rotary wing, said rotary wing having a fixed curved guiding surface extending into the open air from the lower edge of each exit slot, means for feeding pressure gas through said wing to said exit slots; means for controlling the flow of pressure gas through at least one of said exit slots; each of said guiding surfaces comprising at least one opening and means for feeding gas through said openings in at least one direction.

2. Propulsive means according to claim 1, wherein gas stream and guiding surface form a separation line transverse of the gas stream; and comprising a single row of openings in each guiding surface arranged transverse of the direction of flow of said gas stream, and tubular means connected to said row and means for blowing gas through said tubular means.

3. Propulsive means according to claim 1, comprising a single row of openings in each guiding surface arranged transverse to the direction of flow of the gas stream, a single tube in each side of the wing connecting said openings with the interior of said rotary air wing, valve means for said tubes and means controlling said valve means for permitting a portion of the gas flowing through said air wing to enter a tube, said valve means coupled to the rotation of said air wing for supplying periodically larger and smaller quantities of gas, respectively, to said exit slots depending upon the angle of rotation of said rotary wing.

4. Propulsive means according to claim 1, wherein gas stream and guiding surface form a separation line transverse of the gas stream; and comprising several rows of openings on each of said guiding surfaces arranged transverse of the direction of flow of said gas stream, spaced from each other, several tubular means connected to said rows and control means for feeding a gas stream selectively through said tubular means so as to cause it to pass through predetermined rows of openings.

5. Propulsive means according to claim 1, wherein gas stream and guiding surface form a separation line transverse of the gas stream, and comprising several rows of openings on each of said guiding surfaces arranged transverse of the direction of flow of said gas stream, spaced from each other, several tubular means connected to said rows and control means for blowing gas selectively through predetermined tubular means so as to cause it to pass through the openings of said predetermined rows.

6. Propulsive means according to claim 1, comprising several rows of openings in each of said guiding surfaces arranged transverse of the direction of flow of said gas stream, spaced from each other, several tubular means connected to said rows and control means for feeding a gas stream selectively through said tubular means so as to cause it to pass through predetermined rows of openings.

7. Propulsive means according to claim 1, comprising several rows of openings in each guiding surface arranged transverse to the direction of flow of the gas stream, spaced from each other, a plurality of tubes connecting said openings with the interior of said rotary air wing, valve means for said tubes and means controlling said valve means for selectively permitting a portion of the gas flowing through said air wing to enter a predetermined tube so as to cause the gas stream leaving a predetermined exit slot to separate from said guiding surface at a point preceding that row of openings corresponding to said predetermined tubular means.

8. Propulsive means according to claim 1, comprising several rows of openings in each guiding surface arranged transverse of the direction of flow of the gas stream, spaced from each other, a plurality of tubes connecting said openings with the interior of said air wing, valve means for said tubes and means depending on the rotation of said air wing, controlling said valve means for permitting part of the gas flowing through said air wing to enter a predetermined tube within a predetermined range of angle of rotation so as to cause the gas stream leaving the corresponding exit slot to separate from the guiding surface at a point preceding that row of openings corresponding to said predetermined tube.

9. Propulsive means according to claim 1, wherein said pressure gas producing means include an engine turbine set connected to said girder arm; and comprising several rows of openings in each guiding surface arranged transverse to the direction of flow of the pressure air stream, spaced from each other, a plurality of tubular means connecting said openings with the interior of said air wing, valve means controlling said tubular means and means depending on the rotation of said air wing and operative on said valve means to permit a portion of the pressure air stream flowing through said air wing to enter a predetermined tubular means within a predetermined range of angle of rotation of said air wing so as to cause the pressure air stream leaving the corresponding exit slot to separate from the guiding surface at a point preceding that row of openings corresponding to said predetermined tubular means.

10. Propulsive means according to claim 1, wherein said pressure gas producing means include a combustion set connected to said girder arm for producing a combustion gas stream and comprising several rows of openings in each guiding surface arranged transverse to the direction of flow of the gas stream, spaced from each other, a plurality of tubular means connecting said openings with the interior of said air wing, valve means controlling said tubular means, means depending on the rotation of said air wing, controlling said valve means for permitting a portion of the gas stream flowing through said air wing to enter a predetermined tubular means within a predetermined range of the angle of rotation of said air wing so as to cause the gas stream leaving the corresponding slot to separate from the guiding surface at a point preceding that row of openings which corresponds to said predetermined tubular means.

11. In a propulsive means for aircraft, a hollow rotary wing having opposite longitudinal edges with substantially longitudinal exit slots along said edges, a girder arm supporting said rotary wing and having a hollow space communicating with the interior of said rotary wing; said rotary wing having a fixed curved guiding surface projecting over the lower edges of each exit slot, means for feeding pressure gas to said hollow space of said girder arm, several rows of openings in each guiding surface arranged transverse of the direction of flow of the gas stream, spaced from each other, a plurality of tubes connecting said openings with the interior of said air wing, valve means for said tubes and means depending on the rotation of said air wing, controlling said valve means for permitting part of the gas flowing through said air wing to enter a predetermined tube within a predetermined range of angle of rotation so as to cause the gas stream leaving the corresponding exit slot to separate from the guiding surface at a point preceding that row of openings corresponding to said predetermined tube.

12. In a propulsive means for aircraft, a hollow rotary wing having opposite longitudinal edges with substantially longitudinal exit slots along said edges, a girder arm supporting said rotary wing and having a hollow space communicating with the interior of said rotary wing; said rotary wing having a fixed curved guiding surface projecting over the lower edges of each exit slot, means for feeding pressure gas to said hollow space of said girder arm including an engine turbine set connected to said girder arm; several rows of openings in each guiding surface arranged transverse to the direction of flow of the pressure air stream, spaced from each other, a plurality of tubular means connecting said openings with the interior of said air wing, valve means controlling said tubular means and means depending on the rotation of said air wing and operative on said valve means to permit a portion of the pressure air stream flowing through said air wing to enter a predetermined tubular means within a predetermined range of angle of rotation of said air wing so as to cause the pressure air stream leaving the corresponding exit slot to separate from the guiding surface at a point preceding that row of openings corresponding to said predetermined tubular means.

13. In a propulsive means for aircraft, a hollow rotary wing having opposite longitudinal edges with substantially longitudinal exit slots along said edges, a girder arm supporting said rotary wing and having a hollow space communicating with the interior of said rotary wing; said rotary wing having a fixed curved guiding surface projecting over the lower edges of each exit slot, means for feeding pressure gas to said hollow space of said girder arm including a combustion set connected to said girder arm for producing a combustion gas stream; several rows of openings in each guiding surface arranged transverse to the direction of flow of the gas stream, spaced from each other, a plurality of tubular means connecting said openings with the interior of said air wing, valve means controlling said tubular means, means depending on the rotation of said air wing, controlling said valve means for permitting a portion of the gas stream flowing through said air wing to enter a predetermined tubular means within a predetermined range of the angle of rotation of said air wing so as to cause the gas stream leaving the corresponding slot to separate from the guiding surface at a point preceding that row of openings which corresponds to said predetermined tubular means.

References Cited in the file of this patent

UNITED STATES PATENTS

| | | |
|---|---|---|
| 1,982,969 | Stalker | Dec. 14, 1934 |
| 2,041,787 | Stalker | May 26, 1936 |
| 2,479,487 | Goembel | Aug. 16, 1949 |
| 2,483,480 | Stalker | Oct. 4, 1949 |
| 2,556,710 | Stalker | June 12, 1951 |
| 2,650,666 | Dorand et al. | Sept. 11, 1953 |
| 2,793,493 | Kadosch et al. | May 28, 1957 |
| 2,875,578 | Kadosch et al. | Mar. 3, 1959 |
| 2,899,149 | Breguet | Aug. 11, 1959 |
| 2,955,780 | Hulbert | Oct. 11, 1960 |

FOREIGN PATENTS

| | | |
|---|---|---|
| 1,057,506 | France | Mar. 9, 1954 |